United States Patent [19]

Lide

[11] Patent Number: 5,762,457
[45] Date of Patent: Jun. 9, 1998

[54] THREADED FASTENER WITH LONGITUDINAL GROOVES

[76] Inventor: Thomas E. Lide, 5629 Sportsman Ct., Jacksonville, Fla. 32244

[21] Appl. No.: 705,788

[22] Filed: Aug. 30, 1996

Related U.S. Application Data

[63] Continuation-in-part of Ser. No. 523,771, Sep. 5, 1995, Pat. No. 5,590,574.

[51] Int. Cl.⁶ .............................. F16B 23/00; F16B 35/06
[52] U.S. Cl. .............................. 411/405; 411/410; 411/919
[58] Field of Search ............................. 411/402, 403, 411/405, 410, 919

[56] References Cited

U.S. PATENT DOCUMENTS

| | | | |
|---|---|---|---|
| 1,865,346 | 6/1932 | Wells | 411/405 X |
| 2,451,747 | 10/1948 | Kindt | 411/405 X |
| 3,236,141 | 2/1966 | Smith | 411/405 X |
| 5,575,602 | 11/1996 | Savage et al. | 411/405 |

FOREIGN PATENT DOCUMENTS

| | | | |
|---|---|---|---|
| 2306991 | 9/1973 | Germany | 411/405 |

*Primary Examiner*—Neill R. Wilson
*Attorney, Agent, or Firm*—Thomas C. Saitta

[57] ABSTRACT

A threaded fastener having an elongated threaded shaft portion, an enlarged head portion connected in axial alignment to said shaft portion, and a plurality of longitudinal grooves positioned circumferentially around said head portion. The fastener has a longitudinal axis, and the grooves are positioned parallel to this axis. The grooves engage the shaft portion adjacent the head, such that the grooves extend completely from the free end of the head to the point where the shaft is connected to the head. The grooves preferably extend radially toward the longitudinal axis to a depth equal to the outer diameter of the threaded shaft.

11 Claims, 1 Drawing Sheet

THREADED FASTENER WITH LONGITUDINAL GROOVES

This is a continuation-in-part of application Ser. No. 08/523,771, filed Sep. 5, 1995, now U.S. Pat. No. 5,590,574.

BACKGROUND OF THE INVENTION

This invention relates to the technology of drivers and fasteners; and more particularly, to threaded fasteners expressly adapted to be held within a driver and fed automatically out the end of the driver shaft, which is hollow and contains a plurality of inwardly facing longitudinal splines adapted to engage a plurality of longitudinal grooves spaced circumferentially around the head of each fastener, such that the fasteners are maintained in axial alignment within the driver shaft and the outermost fastener can be rotationally driven into a workpiece by the driver.

Screwdrivers are exemplary tools that have always required two hands for efficient operation; one hand holds the screw in place to enter a threaded hole while the other hand turns the screwdriver to engage the thread of the screw with the threads of the hole. In order to avoid the concurrent use of two hands, there have been attempts to place two spring biased grippers on the screwdriver so as to temporarily hold the screw against the blade of the screw driver while the operator attempts to engage the threads of the screw into the threads of the hole. Still another idea has been to magnetize the tip of the screw driver so as to hold a steel screw onto the blade of the screwdriver until the threads of the screw are engaged with the threads of the hole. Neither of these novel ideas has met with more than minor success. The spring grippers rapidly become too loose by being sprung out of shape. The magnetized screwdriver tip has no stability to cause the screw to stand as an extension of the screwdriver shaft, and in no event is it useful with screws made of nonmagnetic materials.

It is an object of this invention to provide a novel threaded fastener which can be used in combination with a driver device which automatically feeds successive fasteners from within a hollow drive shaft, said fasteners being positioned axially within said shaft, whereby the fasteners have an elongated, threaded shaft portion connected to an enlarged head, the head having a plurality of circumferentially spaced, longitudinal grooves extending from the connected end of the threaded shaft portion through the entire head. The grooves are adapted to mate with longitudinal splines within the shaft of the driver, such that the splines maintain the fasteners in axial alignment with the central axis of the shaft by restricting movement of the threaded portion off the axis, and further where the splines engage the grooves to provide the means to rotate the fasteners into a workpiece.

SUMMARY OF THE INVENTION

The invention comprises a threaded fastener having an elongated threaded shaft portion, an enlarged head portion connected in axial alignment to said shaft portion, and a plurality of longitudinal grooves positioned circumferentially around said head portion. The fastener has a longitudinal central axis, and the grooves are positioned parallel to this axis. The grooves engage the shaft portion adjacent the head, such that the grooves extend completely from the top of the head to the point where the shaft is connected to the head. The outer perimeter of the head may be circular or polygonal, and the top of the head may be flat or curved. The grooves preferably extend radially toward the longitudinal axis to a depth equal to the outer diameter of the threaded shaft. The free end of the threaded shaft may be flat, round or pointed.

The fasteners are particularly adapted to work in combination with a particularly designed driver having a hollow shaft with a plurality of longitudinally extending splines configured to match with the grooves of the fastener. Such a driver is disclosed in pending U.S. patent application Ser. No. 08/523,771, and the disclosure therein is incorporated herein by reference. The combination of splines and grooves acts to maintain a plurality of fasteners in axial alignment within the hollow shaft driver, since the grooves extend to a depth equal to the outer diameter of the threaded shaft, thereby preventing the elongated threaded shaft from moving out of axial alignment. The splines also provide the mating engagement which allows the driver to rotate the fastener extending from the shaft to direct it into a workpiece. In a driver having a relatively extended hollow bore to receive a number of fasteners, the splines of the driver will rotate the fasteners held internally to the bore as well as the outermost fastener.

DETAILED DESCRIPTION OF THE INVENTION

Figure 1:
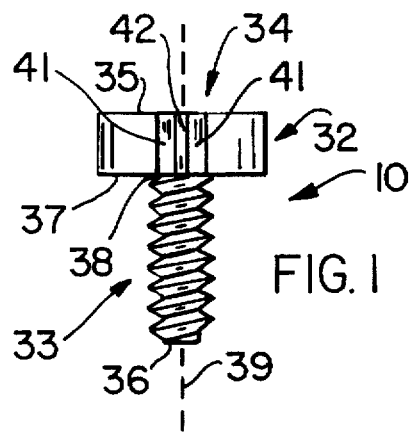
FIG. 1 is a side view showing the invention.

The invention will now be disclosed with reference to the drawings and with regard for the best mode and preferred embodiment. The invention is a threaded fastener 10 having an elongated threaded shaft portion 33 having a free end 36 and a connected end 38, an enlarged head portion 32 having a top end 35 and a connected end 37, where said connected end 38 of shaft 33 is joined to the connected end 37 of head 32, and elongated longitudinal grooves 34 positioned around the circumference of head 32. The fastener has a longitudinal axis 39 centrally positioned within the shaft 33 and head 32. The top end 35 of head 32 may be flat or curved, and the free end 36 of shaft 33 may be flat, rounded or pointed. Head 32 may be circular or polygonal. Shaft 33 may be cylindrical or tapered.

Figure 4:
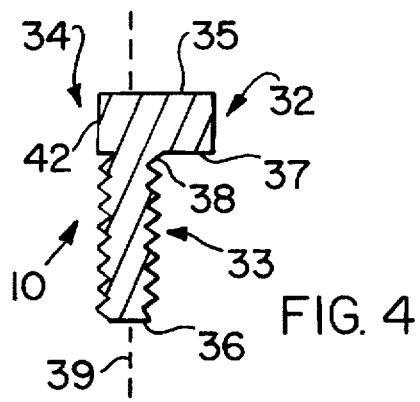
FIG. 4 is a cross-sectional view of the invention, taken along line IV—IV of FIG. 3.
Figure 2:
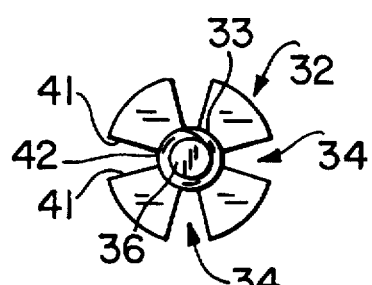
FIG. 2 is an end view, as seen from the threaded shaft free end.
Figure 5:
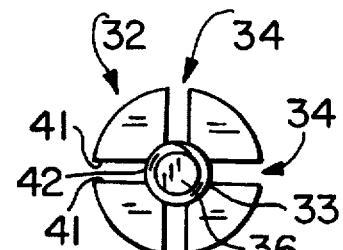
FIG. 5 is a side view of an alternative embodiment of the invention.
Figure 7:
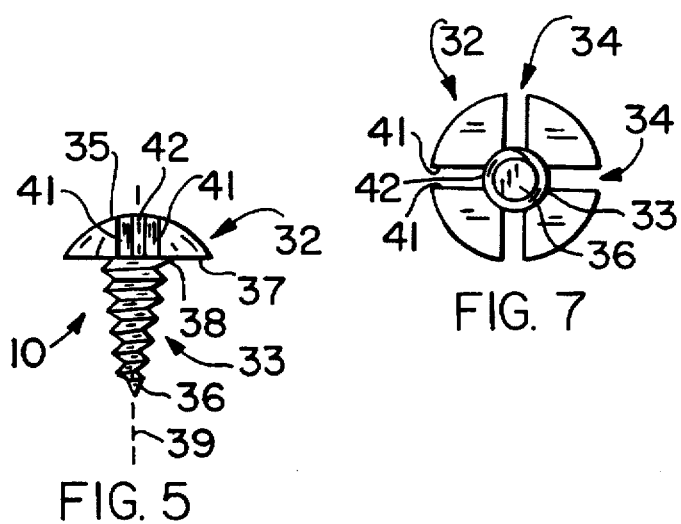
FIG. 7 is an end view, as seen from the threaded shaft free end, showing grooves with parallel walls.
Figure 3:
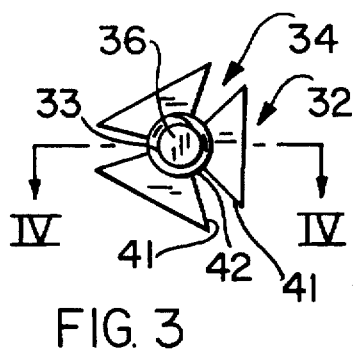
FIG. 3 is an end view of an alternative embodiment, as seen from the threaded shaft free end.
Figure 6:
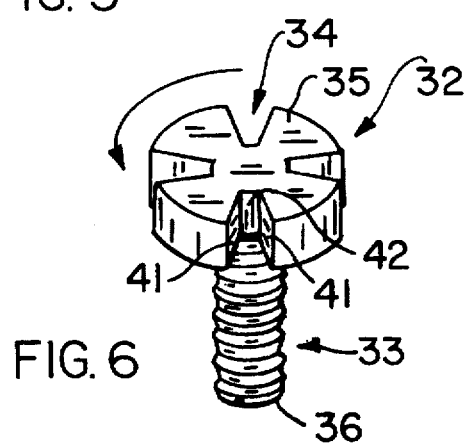
FIG. 6 is a perspective view of the invention.

Grooves 34 are circumferentially spaced around the outer perimeter of head 32 and extend radially from the perimeter toward the longitudinal axis 39. The grooves 34 are preferably equilaterally spaced around the perimeter of the head 32, such that an even number of grooves 34 will have opposing pairs facing each other, as shown in FIGS. 2 and 7, and an odd number of grooves 34 will be offset, as shown in FIGS. 3 and 4. The grooves 34 extend longitudinally, parallel to the axis 39, the complete length of head 32 from the top end 35 to the connected end 37 such that the grooves 34 terminate at the connected end 38 of shaft 33, as seen in FIGS. 1 and 4. The grooves 34 extend inwardly toward the axis 39 to a depth relatively adjacent to and preferably approximately equal to the outer diameter of the threaded shaft 33, as shown in FIGS. 2 and 3. The walls of the grooves 34 may be parallel to form generally rectangular slots or may diminish in width in the radial direction toward the longitudinal axis 39 to form wedge-shaped slots, where it is preferred that the walls 41 of grooves 34 not meet to form an angle but rather are joined by an interior surface 42, flat or curved, at their innermost depth. In this manner the radial distance from the axis 39 to the innermost surfaces 42 of grooves 34 is generally equal to the radial distance from the axis 39 to the outer diameter of the threaded shaft 33, thus providing a number of positions around the perimeter corresponding to the grooves 34 where the maximum diameter of the fastener 10 does not exceed the maximum diameter of the threaded shaft 33. This configuration allows the fasteners 10 to be moved in the axial direction within the shaft of a driver having longitudinally extending splines which correspond to the grooves 34, whereby the splines prevent the fasteners 10 from becoming misaligned relative to the longitudinal axis of the driver shaft, since the splines provide guide means along the full extent of the threaded shaft 33 of each fastener 10 to restrict movement of the threaded shaft 33 in the radial direction, as disclosed fully in pending U.S. patent application Ser. No. 08/523,771, incorporated herein by reference. The splines further provide the means to rotate the fasteners 10 by engaging with the grooves 34 in order to drive the fastener 10 into a workpiece.

It is understood that equivalents and substitutions may be obvious to those skilled in the art, and the true scope and definition of the invention therefore is to be as set forth in the following claims.

I claim:

1. A fastener having a longitudinal axis and comprising an elongated threaded shaft portion having a free end and a connected end, an enlarged head portion having a top end and a connected end, said connected end of said shaft portion being connected to said connected end of said head portion, and a plurality of longitudinal grooves parallel to said longitudinal axis positioned circumferentially around said head portion, each of said grooves extending radially inward toward said longitudinal axis, each of said grooves extending longitudinally from said top end of said head portion to said connected end of said head portion, each of said grooves extending to a depth approximately equal to the outer diameter of said shaft portion.

2. The fastener of claim 1, where said grooves comprise a pair of walls joined by an interior surface.

3. The fastener of claim 2, where said interior surface is curved.

4. The fastener of claim 2, where the width of each of said grooves diminishes in the radial direction toward said longitudinal axis, such that said walls are not parallel.

5. The fastener of claim 2, where said walls of said grooves are parallel.

6. The fastener of claim 1, where said head portion is polygonal.

7. The fastener of claim 1, where said head portion is circular.

8. The fastener of claim 1, where said shaft portion is cylindrical.

9. The fastener of claim 1, where said shaft portion is tapered.

10. The fastener of claim 1, where said top end of said head portion is flat.

11. The fastener of claim 1, where said free end of said shaft portion is flat.

* * * * *